July 25, 1939.  A. McDONALD  2,167,392
APPARATUS FOR FORMING MOLDED ARTICLES
Filed Jan. 20, 1936   3 Sheets-Sheet 2

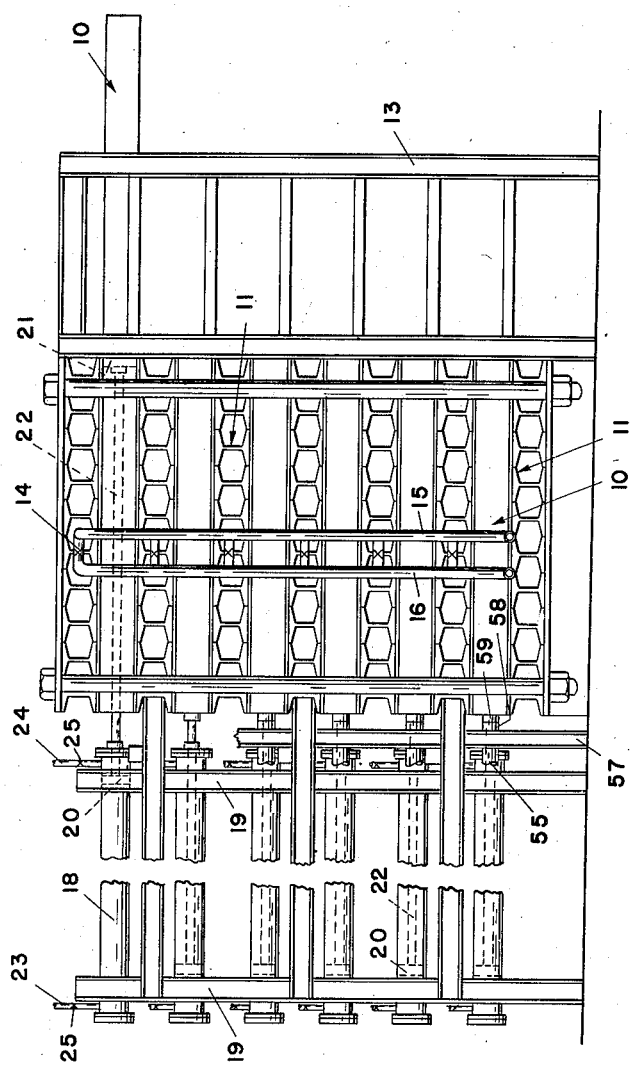

*INVENTOR*
ANGUS McDONALD
BY
*ATTORNEYS*

July 25, 1939.  A. McDONALD  2,167,392
APPARATUS FOR FORMING MOLDED ARTICLES
Filed Jan. 20, 1936  3 Sheets-Sheet 3
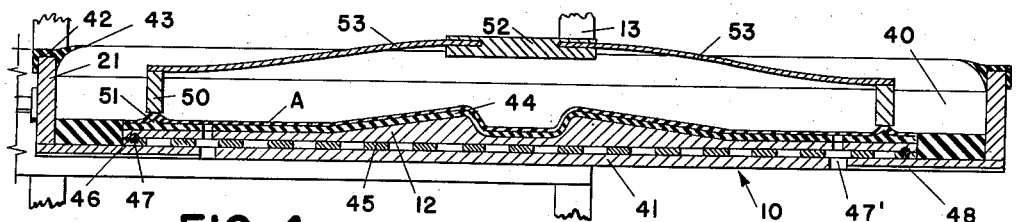
FIG. 4.
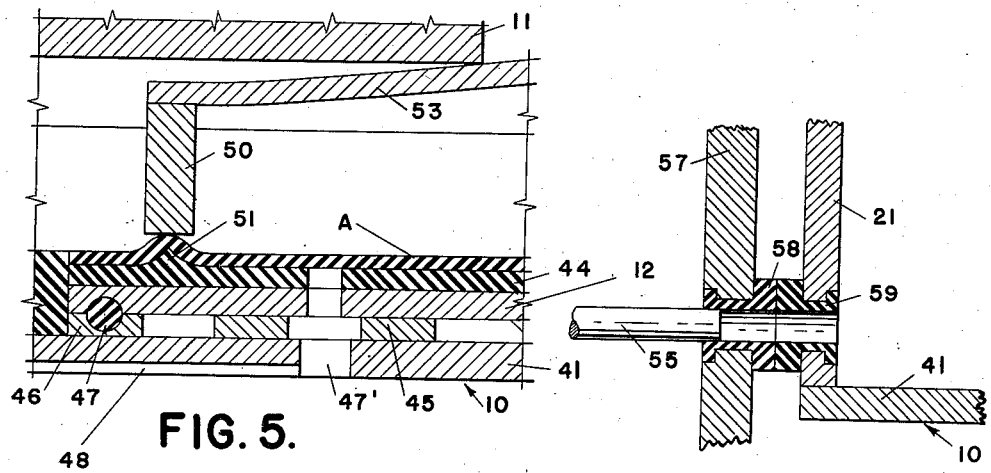
FIG. 5.
FIG. 6.
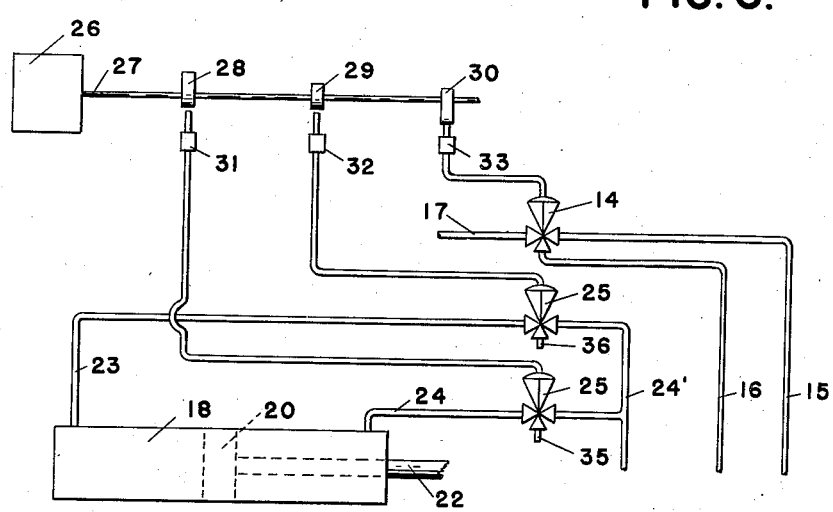
FIG. 7.
INVENTOR
ANGUS McDONALD
BY Whittemore Hulbert
Whittemore & Belknap
ATTORNEYS Patented July 25, 1939

2,167,392

UNITED STATES PATENT OFFICE 2,167,392

APPARATUS FOR FORMING MOLDED ARTICLES

Angus McDonald, Pontiac, Mich., assignor to Baldwin Rubber Company, Pontiac, Mich., a corporation of Michigan Application January 20, 1936, Serial No. 59,973

8 Claims. (Cl. 18—17)

This invention relates generally to molding apparatus and refers more particularly to an improved apparatus for manufacturing contoured articles.

Although the principles involved herein may be advantageously employed in the manufacture of numerous different types of contoured articles, nevertheless, the apparatus finds particular utility when used to form contoured floor mats from a yieldable, vulcanizable material, such as rubber or rubber composition.

One of the principal objects of this invention is to appreciably reduce the cost of manufacture of contoured articles of the foregoing character by providing apparatus which, in addition to being simpler and more compact than the apparatus employed in the past for this purpose, is capable of producing the contoured articles at a considerably faster rate.

Another object of the invention which contributes materially in securing the foregoing results resides in the provision of molding apparatus wherein the stock to be contoured is urged toward its cooperating mold by applying fluid under pressure directly to the stock, rather than through a diaphragm, and wherein the temperature of the fluid under pressure is sufficient to cure or vulcanize the stock to the contour of the mold. The elimination of the usual flexible diaphragm not only expedites the molding operation but, in addition, appreciably reduces the cost of maintenance of the apparatus and renders it possible to more accurately form the stock to the contour of the mold. The cost of maintenance is reduced and the production of the apparatus is expedited, since the necessity of periodically discontinuing the operation of the apparatus to replace the diaphragms no longer exists. The contour of the stock may be more accurately formed, due to the fact that the fluid under pressure acts directly on the stock and this insures filling of all of the mold cavities with the stock.

Another advantageous feature of this invention which also contributes to reducing the cost of manufacture of the articles resides in the provision of apparatus equipped to mold a plurality of articles simultaneously. In accordance with this invention, a plurality of fluid pressure chambers or platens are arranged in superimposed relation with a header therebetween and the arrangement is such that the platens may be individually, or successively, moved to their open and closed positions without effecting the molding operation in adjacent platens.

Another object of this invention resides in the provision of apparatus of the foregoing character wherein the platens are mounted for individual sliding movement relative to the headers and wherein means is provided for automatically moving the platens to their operative and inoperative positions with respect to the headers.

A further object of this invention resides in the provision of means for regulating the operation of the platen actuating means, in such a manner that the platens are individually moved to their operative and inoperative positions in timed relation. In accordance with this invention, the platens are automatically and alternatively moved to their inoperative positions after a predetermined interval of time elapses and are automatically returned to their operative positions after sufficient time has elapsed to permit the operator to reload the platens. With this arrangement, if the platens are loaded with blanks and successively moved to their operative positions with respect to the headers, the same will be automatically successively moved to their open positions in the same order, and this offers the possibility of appreciably expediting the operation of the apparatus with the minimum attention.

A further advantageous feature of this invention resides in the provision of means for automatically controlling the flow of fluid pressure through the headers to the platens in timed relation to the operation of the latter.

In addition to the foregoing, the present invention contemplates an improved seal between the stock in the platens and the associated mold members. This seal, as well as the foregoing and other objects of the invention, will be made more apparent as this description proceeds, especially when considered in connection with the accompanying drawings, wherein:

Figure 1 is a side elevational view of the molding apparatus constructed in accordance with this invention;

Figure 4 is a cross sectional view through one of the platens;

Figure 5 is an enlarged sectional view of a portion of the construction shown in Figure 4;

Figure 6 is a fragmentary sectional view illustrating the drain opening for one of the platens; and Figure 7 is a diagrammatic view of the control means for regulating the fluid pressure and the operation of the platens.

In general, the molding apparatus comprises a plurality of platens in the form of chambers 10 supported in superimposed relationship with a header 11 interposed between adjacent platens. The platens are supported independent of each other for sliding movement relative to the headers, and a contoured form 12 is suitably supported within each of the platens on the bottom wall thereof. With reference to Figure 4, it will be apparent that the platens are open at the top and cooperate with adjacent headers in the closed position thereof, to form closed chambers above the contoured forms 12 for receiving fluid under pressure in the manner about to be described.

Figure 2:
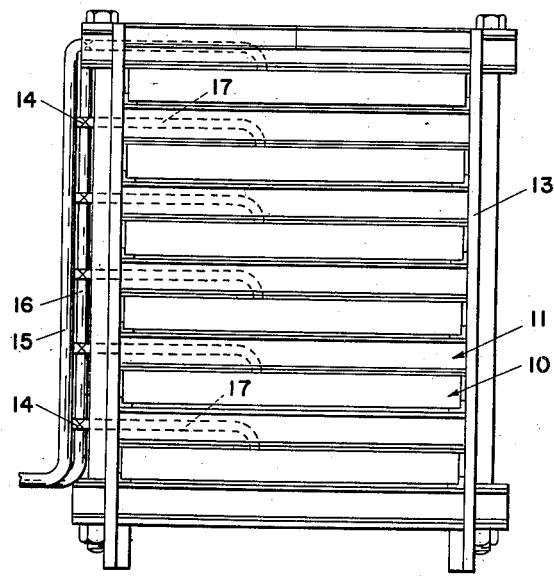
Figure 2 is a front elevational view of the apparatus shown in Figure 1.

In the present instance, when the platens are in their operative or closed positions with respect to the headers, fluid under pressure is introduced into each platen through the header located immediately above the same. In other words, a separate fluid supply line is provided for each platen and the flow of fluid pressure to each platen is controlled by a three-way valve 14 located in the fluid supply line. As shown in both of Figures 1 and 2, the fluid supply line comprises an intake manifold 15, an exhaust manifold 16, and a plurality of supply conduits 17 corresponding in number to the number of platens. The supply conduits are supported in the headers 11 with the inner ends thereof communicating, through the bottom walls of the headers, with the interior of the platens and having the outer ends communicating with both the aforesaid manifolds through the three-way valves 14. The three-way valves 14 are independently automatically actuated at predetermined intervals to successively admit fluid under pressure to the platens from the intake manifold 15, close communication between the intake manifold and supply conduits 17, and to simultaneously open communication between the supply conduits and exhaust manifold 16.

Each of the valves 14 is operated to accomplish the above results in timed relation to movement of the platens and this result is secured by controlling the action of the valves, as well as the platen actuating means with a control system of the type diagrammatically shown in Figure 7. This system is so selected that when the platens are moved by their respective actuating means to their closed positions, the valves 14 are operated by the control system to open communication between the supply conduits 17 and the fluid pressure intake manifold 15, and just prior to movement of the platens to their inoperative positions on the supporting racks 13, to close the aforesaid communication and to connect the supply conduits 17 with the exhaust manifold 16 to scavenge the platens. Thus, it will be apparent that the control system in Figure 7 serves to accurately time the various molding operations in the apparatus and renders the production of the latter consistent.

The purpose of independently controlling the operation of each platen is to appreciably expedite the molding operation by rendering alternative operation of the several platens possible. In actual practice, the platens are handled from one end of the apparatus to the other and the arrangement is preferably such that while one of the platens is being loaded, the remaining platens are in different stages of operation. Assuming that the uppermost platen is in the inoperative position thereof shown in Figure 1, it will be noted that as soon as a sheet of uncured stock is placed on the mold in this platen, the latter is automatically moved inwardly to its operative position and during the interval the stock in this platen is being molded, the next adjacent platen is automatically moved to its inoperative position on the supporting rack 13 so as to permit the completed article to be removed and a blank to be inserted in position on the contoured form. This latter platen is then automatically returned to its operative position and the remaining platens successively undergo the same cycle of operation.

It has been previously stated that the platens 10 are automatically actuated and that the operation of each platen is controlled by a system of the type shown in Figure 7. This is accomplished in the present instance by providing a double-acting fluid pressure operated cylinder 18 for each of the platens. The cylinders 18 are supported at the rear side of the apparatus on suitable frames 19 and the piston 20 in each cylinder is operatively connected to the rear wall 21 of each platen by means of a connecting rod 22. Fluid pressure is alternately admitted into each cylinder on opposite sides of the piston 20 therein by means of two fluid supply conduits 23 and 24 located at opposite ends of each cylinder. The flow of fluid through each of the conduits is controlled by a three-way valve 25 and the latter valves of each cylinder are automatically actuated by a system of the type shown in Figure 7. Thus, it will be apparent that the two valves 25 of each cylinder and the valve 14 for the associated platen are automatically operated in timed relation by the system featured in Figure 7.

Although it will be apparent from the foregoing that the number of valve control systems corresponds to the number of platens, nevertheless, only one of these systems is shown herein for the purpose of illustration. Furthermore, the control system will only be briefly described, since any one of a number of designs may be employed for accomplishing the desired operation. In general, the control system comprises an electrically operated timing device 26 for actuating a cam shaft 27 having three cams, 28, 29 and 30 secured thereto. The aforesaid cams, in turn, are adapted to respectively actuate three air valves 31, 32 and 33. The air valve 33 communicates with one of the three-way valves 14 and functions in dependence upon the operation of the cam 30 to actuate this valve 14 to open communication between the intake manifold 15 and fluid supply conduit 17. The valve 14 is held in the aforesaid open position by the cam 30 until the stock in the platen is completely cured to the contour of the mold, whereupon, the cam 30 permits the air valve 33 to close under the action of its spring and to exhaust the air pressure from the valve 14. When this is accomplished, the spring associated with the valve 14 immediately moves the latter to a position wherein communication is established between the supply line 17 and the exhaust manifold 16 to permit scavenging the platen. In timed relation to the operation of the cam 30 to permit scavenging the platen, the cam 29 opens the air valve 32 to supply air pressure to the valve 25 associated with the outer end of the double-acting cylinder 18 for the platen under consideration. The aforesaid valve 25 is operated by the air pressure to establish communication between the fluid supply line 24' and the cylinder at the outer side of the piston 20 to move the latter in an inward direction and thereby open the platen. It will be understood that the cam 28 for the valve 25 at the opposite end of the cylinder is in a position to permit the fluid in the portion of the cylinder at the inner side of the piston to exhaust through the vent 35 as the piston is moved inwardly to open the platen. The platen is maintained open a certain specified time determined to provide for removing the completed article from the platen and inserting another blank on the mold. As soon as this time interval has elapsed, the cam 29 actuates the valve 25 at the outer end of the cylinder 18 to establish communication between the portion of the cylinder at the outer side of the piston 20 and the vent 36. At the same time, the cam 28 operates through the air valve 31 to actuate the valve 25 at the inner end of the cylinder 18 to supply fluid pressure to the cylinder at the inner side of the piston 20 forcing the latter in an outward direction the extent required to move the platen to its operative position with respect to the headers. The aforesaid cycle of operation is then repeated and although the remaining platens may operate at different intervals, nevertheless, the cycle of operation is the same as the one previously described.

Figure 3:
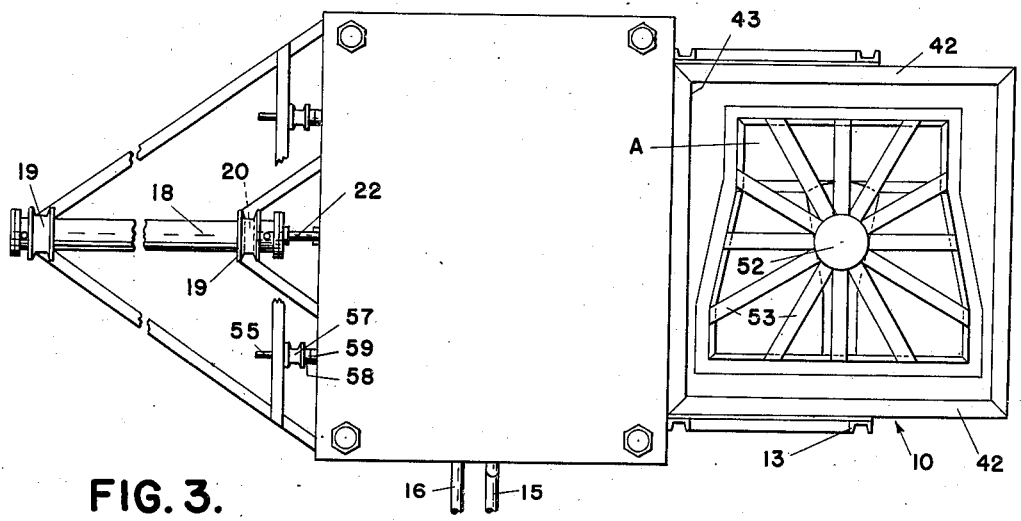
Figure 3 is a plan view of the apparatus.

Referring now more in detail to the particular construction of the several platens 10, attention is directed to Figures 3 and 4 of the drawings wherein one of the platens is shown in detail. It will be understood that all of the platens are preferably identical in construction, and accordingly, a description of one will be sufficient. The platen 10 is in the form of a drawer having end walls 21 and side walls 40 secured in assembled relation by means of a bottom wall 41. The side and end walls have a height approximating the distance between the headers 11, and a frame of sealing rubber 42 is secured to the upper edge of these walls for cooperation with the adjacent wall of the header to effectively seal the interior of the platen when the latter is in its operative position with respect to the headers. Although various different types of seals may be provided, nevertheless, the one shown in the present instance has been found to be particularly effective and this seal is formed with an inwardly extending flexible lip 43 adapted to be firmly engaged throughout its length with the adjacent wall of the header by the action of the fluid under pressure in the platen.

Supported within the platen on the bottom wall 41 thereof is a contoured form 12 having a top surface of predetermined configuration, covered with a hard rubber form 44 adapted to be vulcanized directly to the contoured form so as to form an integral part of the latter. Although the contoured form 12 is supported upon the bottom wall of the platen, nevertheless, it is spaced above the latter by means of suitable spacers. The spacers 46 located at the marginal edge of the contoured form provide a continuous frame and the space defined thereby is sealed from the interior of the chamber by means of the rubber seals 47. The intermediate spacers 45 are relatively short so as not to obstruct the passage of air from the vents 47' to the outlet grooves 48, in the under surface of the bottom wall 41 of the platen. The vents 47' extend through the contoured form and through the rubber covering for the latter and serve to permit any air trapped beneath the stock A to escape or, in other words, to prevent the accumulation of air pockets between the stock A and the contoured form 12.

In order to prevent the fluid under pressure discharged into the platen from finding its way beneath the stock A during the molding operation, I provide means for sealing the stock at the marginal edges thereof. In the present instance, the seal comprises a continuous frame 50, corresponding in contour to the outline of the stock A and defines an area sufficiently less than the stock A to permit the same to engage the stock adjacent the marginal edges thereof. As will be observed from Figure 5, the effectiveness of the seal is enhanced by forming a continuous upwardly extending relatively sharp bead 51 on the contoured form directly below the frame 50 so that a continuous portion of the stock adjacent the marginal edges thereof will be compressed between the bead and frame.

The frame 50 is pivotally secured to the bottom wall 41 of the platen so as to permit the same to be readily raised to its inoperative position when the platen is opened. In the present instance, the frame 50 is yieldably forced into engagement with the stock directly over the bead 51 by the adjacent header when the platen is moved from its open position to its closed position. In the present instance, this is accomplished by connecting the upper edges of the sides of the frame to a pad 52 by means of spring arms 53. The distance between the pad and bottom wall of the platen is slightly greater than the distance between the adjacent headers so that when the platen is moved to a position between the headers, the pad will be forced downwardly in a direction toward the bottom wall of the platen. This action of the pad tensions the spring arms 53 and inasmuch as the latter are connected to the frame 50, it necessarily follows that they serve to yieldably urge the frame 50 into intimate contacting relation with the stock A directly above the bead 51 on the contoured form.

In the event that steam under pressure is employed to urge the stock A into intimate contacting relation with the contoured form, it is possible that a certain amount of condensation will accumulate in the platen and in order to provide for effectively draining the platens, the apparatus is slightly tilted in the manner shown in Figure 1 and a drain pipe 55 is supported adjacent the rear end wall 21 of each of the platens. As shown in Figure 6, each of the drain pipes 55 is secured to a fixed part 57 of the frame 19 in communication with a rubber grommet 58 secured within the fixed part 57 and having the inner end adapted to abut the outer end of a similar grommet 59 secured in the end wall 56 of the platen. The arrangement is such as to provide a separable joint for the drain passage of each platen capable of effecting an efficient seal when the platens are in their operative positions. It will, of course, be understood that the drain conduits 55 are normally closed by a suitable valve (not shown) so as to prevent the escape of fluid under pressure therethrough during the molding operation.

Thus, from the foregoing, it will be observed that I have provided a relatively simple compact apparatus for molding and curing vulcanizable stock to a predetermined contour. It will also be apparent that with my improved apparatus, provision is made for molding a plurality of articles in separate molds capable of individual operation. In addition, it will be observed that my improved apparatus is thoroughly automatic in operation and that the action of the individual molds is such as to permit a relatively large number of the same to be attended to by a single operator. It will further be noted that I have provided improved means for effectively sealing the marginal edges of the stock during the molding operation and that this seal renders it possible to cure the stock by subjecting the same directly to the action of the fluid under pressure.

What I claim as my invention is:

1. In apparatus for molding a plurality of articles to a predetermined contour, a frame, a plurality of platens mounted upon the frame in superimposed relationship for sliding movement relative to the frame, means for sliding said platens to operative and inoperative positions, a contoured form supported in each platen and adapted to support the articles to be molded, means for independently controlling the movement of each platen by the platen sliding means aforesaid, and means for introducing fluid under pressure into each platen in timed relation to the movement thereof.

2. In apparatus for molding a plurality of articles to a predetermined contour, a frame, a plurality of platens arranged in superimposed relation upon the frame and mounted for relative sliding movement, means for independently actuating the platens, a contoured form supported in each platen and having a working surface for supporting the articles to be molded, individual fluid supply lines communicating with each platen in one position of the latter, and means operating in timed relation to the movement of each platen for controlling the flow of fluid under pressure through the supply line therefor.

3. In apparatus for molding a plurality of articles to a predetermined contour, a plurality of headers arranged in superimposed relation and spaced from each other, a platen mounted for sliding movement in each of the spaces between adjacent headers and cooperating with the latter in one relative position to form superimposed closed chambers, a contoured form carried by each platen and adapted to assume positions in the chambers in the aforesaid positions of the platens relative to the headers, an individual fluid pressure supply line for each chamber communicating with the latter in the above mentioned position of the platens relative to the headers, means for independently moving the platens in spaced phase relationship to each other, and means operating in timed relation to the movement of each platen for controlling the flow of fluid under pressure through the supply line therefor.

4. In apparatus for molding a plurality of articles to a predetermined contour, a plurality of headers arranged in superimposed relation and spaced from each other, a platen mounted for sliding movement in each of the spaces between adjacent headers and cooperating with the latter in one relative position to form superimposed closed chambers, a contoured form carried by each platen and adapted to assume positions in the chambers in the aforesaid positions of the platens relative to the headers, an individual fluid pressure supply line for each chamber communicating with the latter in the above mentioned position of the platens relative to the headers, valve means in each fluid supply line operable in one position thereof to admit fluid through the supply lines and in another position to exhaust the fluid, means for independently actuating each platen to move the latter between open and closed positions, and means for automatically controlling the actuation of each of the valve means in timed relation to the movement of the respective platen.

5. In apparatus for molding a plurality of articles to a predetermined contour, a plurality of platens arranged in superimposed relationship and mounted for relative movement, a contoured form located in each platen and having a working surface adapted to support the articles to be molded, means for independently moving the platens, individual fluid pressure supply lines for each platen, and means for independently controlling the movement of each platen by the platen moving means aforesaid and for controlling the flow of fluid pressure into each of the platens in timed relation to the movement thereof.

6. In apparatus for molding a plurality of articles to a predetermined contour, a plurality of platens arranged in superimposed relation and supported for movement relative to each other, a contoured form located in each platen and having a working surface adapted to support an article to be molded, fluid pressure means associated with each platen for moving the same independent of the other platens, an individual fluid pressure supply line for each platen, valve means in each supply line operable in one position to supply fluid pressure to the associated platen and in another position to exhaust the fluid pressure from the platen, and means for independently controlling the operation of each of the platen moving means and the associated valve means.

7. In apparatus for molding a plurality of articles to a predetermined contour, a plurality of platens arranged in superimposed relationship and mounted for relative movement, a contoured form located in each platen and having a working surface adapted to support an article to be molded, means for independently moving the platens in spaced phase relationship to each other, and means for introducing fluid under pressure into each platen in timed relation to the movement thereof.

8. In apparatus for molding an article to a predetermined contour, a header, a platen supported for sliding movement relative to the header and cooperating with the latter in one position thereof to form a closed chamber, a contoured form carried by the platen for movement therewith into the chamber and having a working surface adapted to support an article to be molded, means for introducing fluid under pressure into the chamber, and means located in the platen and engageable with the marginal edges of the article on the contoured form, said last named means having a portion engageable with the header upon sliding movement of the platen to its operative position to force said means toward the article on the contoured form to provide a seal around the marginal edges thereof.

ANGUS McDONALD.